United States Patent [19]
Devaud

[11] Patent Number: 5,868,035
[45] Date of Patent: Feb. 9, 1999

[54] ELECTROHYDRAULIC ACTUATOR FOR CONTROLLING A VEHICLE GEARBOX OF THE TYPE HAVING AN INPUT BARREL

[75] Inventor: Gérard Devaud, Paris, France

[73] Assignee: S.A.M.M.-Societe D'Applications Des Machines Motrices, Bievres, France

[21] Appl. No.: 783,704

[22] Filed: Jan. 15, 1997

[30] Foreign Application Priority Data

Apr. 4, 1996 [FR] France ................................... 96 04258

[51] Int. Cl.⁶ .................................................. F16H 59/00
[52] U.S. Cl. ................................. 74/337.5; 92/68; 92/75; 92/136; 91/521
[58] Field of Search ................................ 92/68, 136, 75; 91/521, 523; 74/337.5

[56] References Cited

U.S. PATENT DOCUMENTS 3,766,835  10/1973  Kobelt ........................................... 92/68
4,456,217  6/1984  Wingegeart et al. ........................ 92/68

FOREIGN PATENT DOCUMENTS 633411  1/1995  European Pat. Off. .
3315221  10/1984  Germany .

*Primary Examiner*—Charles A. Marmor
*Assistant Examiner*—Troy Grabow
*Attorney, Agent, or Firm*—Sughrue, Mion, Zinn, Macpeak & Seas, PLLC

[57] ABSTRACT

This electrohydraulic actuator comprises a pair of hydraulic rams (12, 13) and a rocker (14) integral in terms of rotation with an input shaft (7) of the barrel, the rams are arranged parallel with one another in such a way as to be able to control the rotation of the rocker to make it adopt predetermined angular positions corresponding to the gears (R, N, 1, 2, . . . ) selected and this actuator also comprises solenoid valves for controlling the rams. The rocker (14) extends transversely to the shaft (7) and its ends are designed to be able to interact with respective pistons (17, 18) of the rams (12, 13), each ram comprises three pistons (24, 25, 17; 26, 27, 18) which are coaxial and have different cross sections, arranged in chambers (28, 29) of corresponding cross sections formed in the body (11). This electrohydraulic actuator permits extremely quick and easy control of gear selection for a structure which is relatively simple and has a modest cost of manufacture.

8 Claims, 4 Drawing Sheets

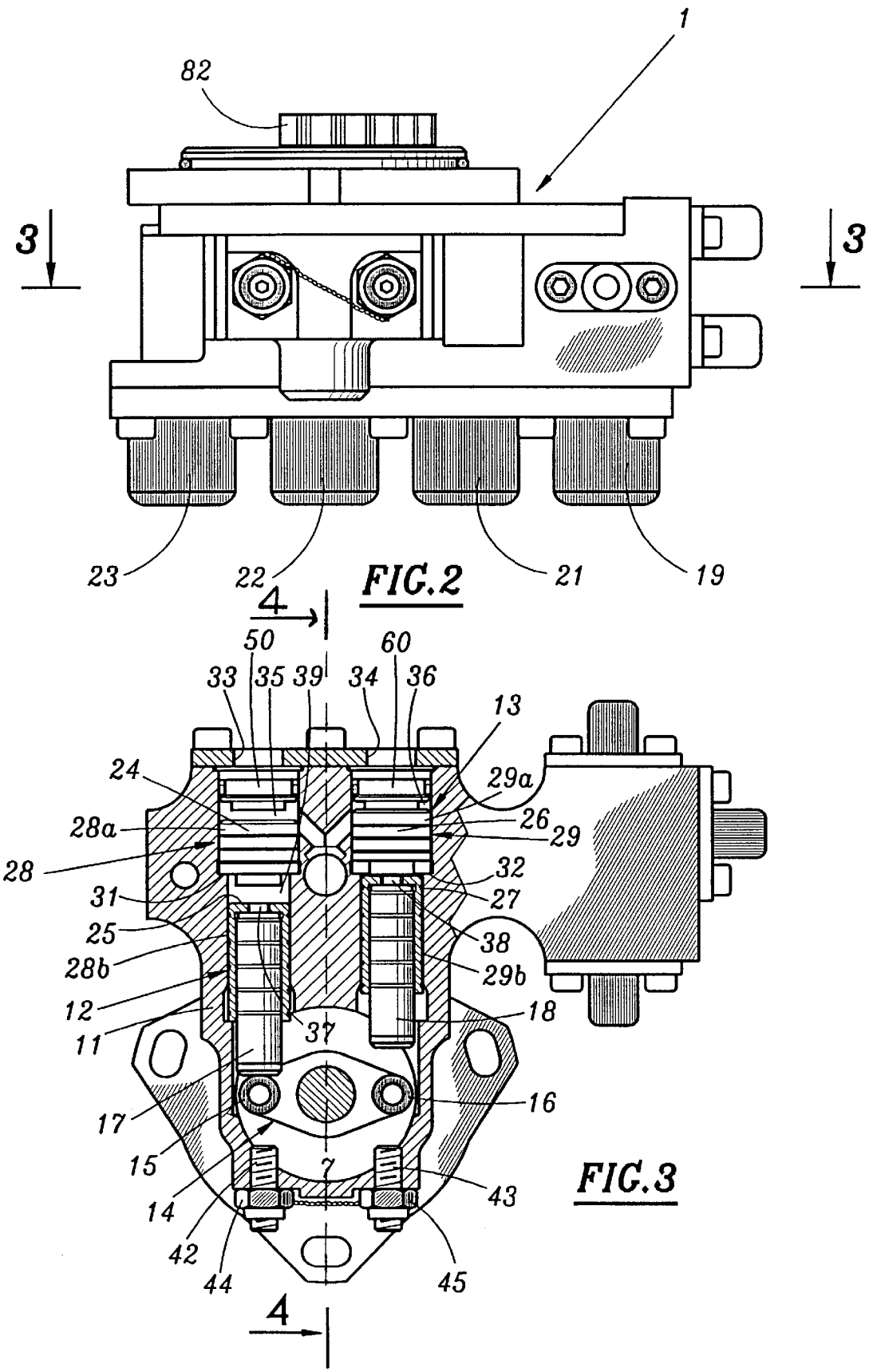

ELECTROHYDRAULIC ACTUATOR FOR CONTROLLING A VEHICLE GEARBOX OF THE TYPE HAVING AN INPUT BARREL

BACKGROUND OF THE INVENTION

The subject of the present invention is an electrohydraulic actuator for controlling the rotation of a vehicle gearbox input barrel, of the type described in FIGS. 6 to 8 of French Patent Application No. 93 08 429 (2,707,359) in the name of Société d'Applications des Machines Motrices.

The actuator targeted by the invention comprises a body containing a rocker integral in terms of rotation with an input shaft of the barrel, and means for controlling the rotation of the rocker which include three hydraulic rams arranged in such a way as to make it adopt the desired angular orientations to give control over the successive gears.

SUMMARY OF THE INVENTION

The object of the invention is to simplify the structure of this prior actuator and therefore substantially to reduce the cost of manufacturing it in order to allow it to be employed on mass-produced motor cars.

In accordance with the invention, the said control means comprise a pair of hydraulic rams arranged parallel to one another so as to be able to control the rotation of the rocker in order to make it adopt predetermined angular positions corresponding to the gears selected, this actuator also comprising solenoid valves for controlling the rams, and each ram comprises three pistons which are coaxial and of different cross sections arranged in chambers of corresponding cross sections formed in the body, the rocker extending transversely to the shaft and its ends being designed to be able to interact with respective pistons of the rams.

This actuator contains just two hydraulic rams instead of three in the embodiment of the aforementioned patent, which simplifies its structure and makes it less expensive.

According to a preferred embodiment, the rocker extends transversely on each side of the shaft and its ends are designed to be able to interact with respective pistons of the rams, and each ram comprises three pistons which are coaxial and have different cross sections, arranged in chambers of corresponding cross sections formed in the body.

According to another feature of the invention, each ram comprises a hydraulic chamber subdivided into two coaxial compartments of different cross sections, the first compartment which has a greater cross section than the second compartment and made on the side furthest from the rocker, contains a first piston which can travel as far as a limit stop delimiting the two compartments, and the second compartment contains a second piston and a third piston, where the third piston is mounted so that it can slide inside the second and interacts with a corresponding end of the rocker.

Other special features and advantages of the invention will become clear from the description which will follow, given with reference to the attached drawings which illustrate one non-limiting exemplary embodiment thereof.

BRIEF DESCRIPTION OF THE DRAWINGS

FIG. 2 is a part view in side elevation of the actuator of FIG. 1.

FIG. 3 is a view in section on 3/3 of FIG. 2;

DESCRIPTION OF A PREFERRED EMBODIMENT

Figure 1:
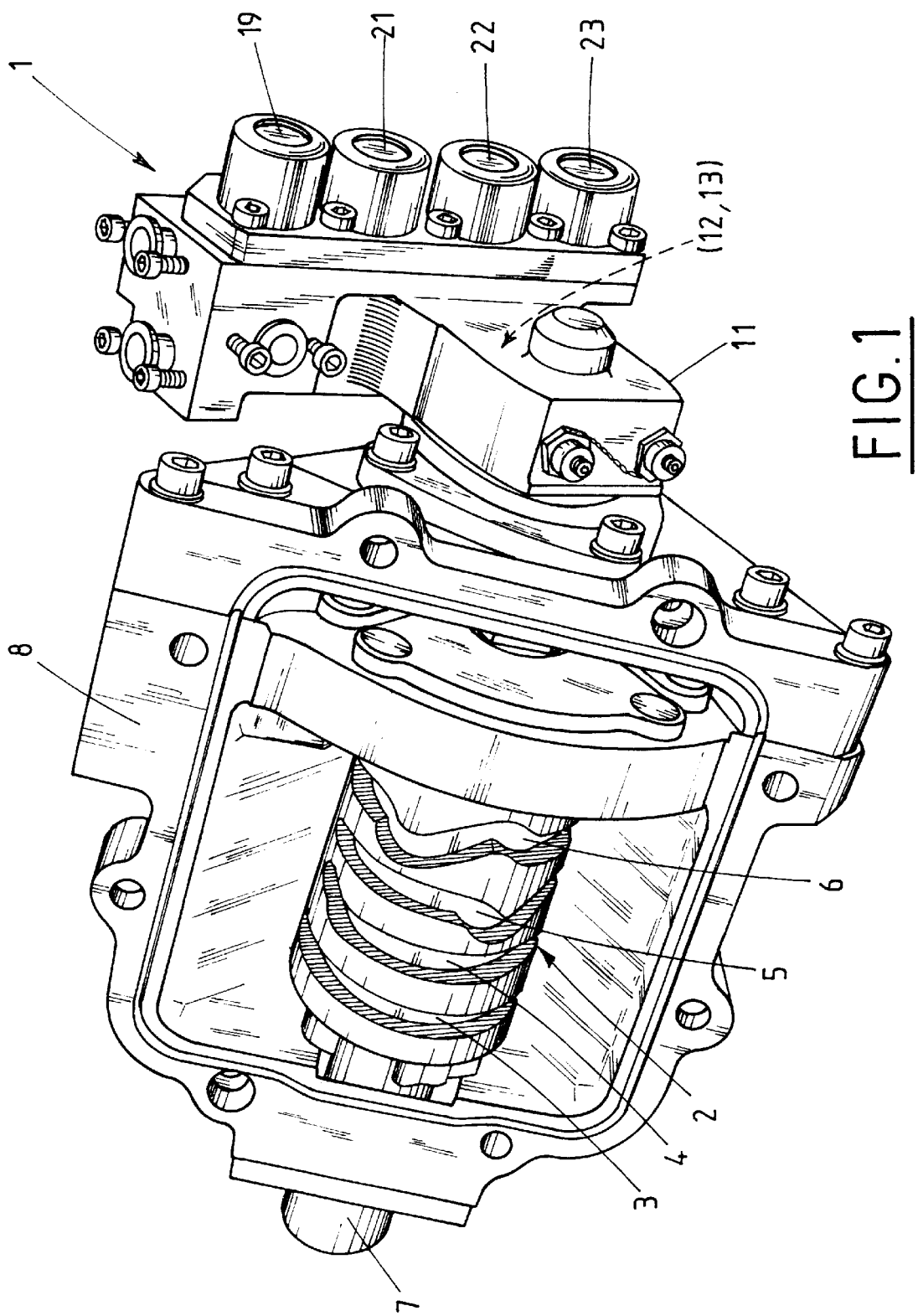
FIG. 1 is a view in perspective of one embodiment of the electrohydraulic actuator targeted by the invention and of the input barrel of a vehicle gearbox controlled by this actuator.

The electrohydraulic actuator 1 represented in the drawings is designed for controlling the rotation of an input barrel 2 of a vehicle gearbox (not represented), a series of suitably profiled grooves 3, 4, 5, 6 . . . being machined in the surface of the barrel 2 to interact with forks, not represented, associated with each gear in a way known per se.

The barrel 2 is mounted on a central shaft 7 carried at its ends by a chassis 8 and of which one end, contiguous with the actuator 1, is equipped with a toothed sector 9 (FIG. 5) in mesh with an output member of the actuator 1.

The latter comprises a body 11 containing a pair of hydraulic rams 12, 13 and a rocker 14 integral in terms of rotation with the shaft 7. The two rams 12, 13 are arranged parallel to each other and on the same side of the rocker 14, which consists of an elongate component extending on each side of the end of the shaft 7. The rocker 14 is provided with two respective transverse studs 15, 16 which can interact with corresponding pistons 17, 18 of the rams 12, 13 which can thus control the rotation of the rocker 14 to make it adopt given angular positions corresponding to the gears chosen.

The rams 12, 13 form part of a hydraulic circuit including four solenoid valves 19, 21, 22, 23 and which will be described in detail hereafter.

Figure 5:
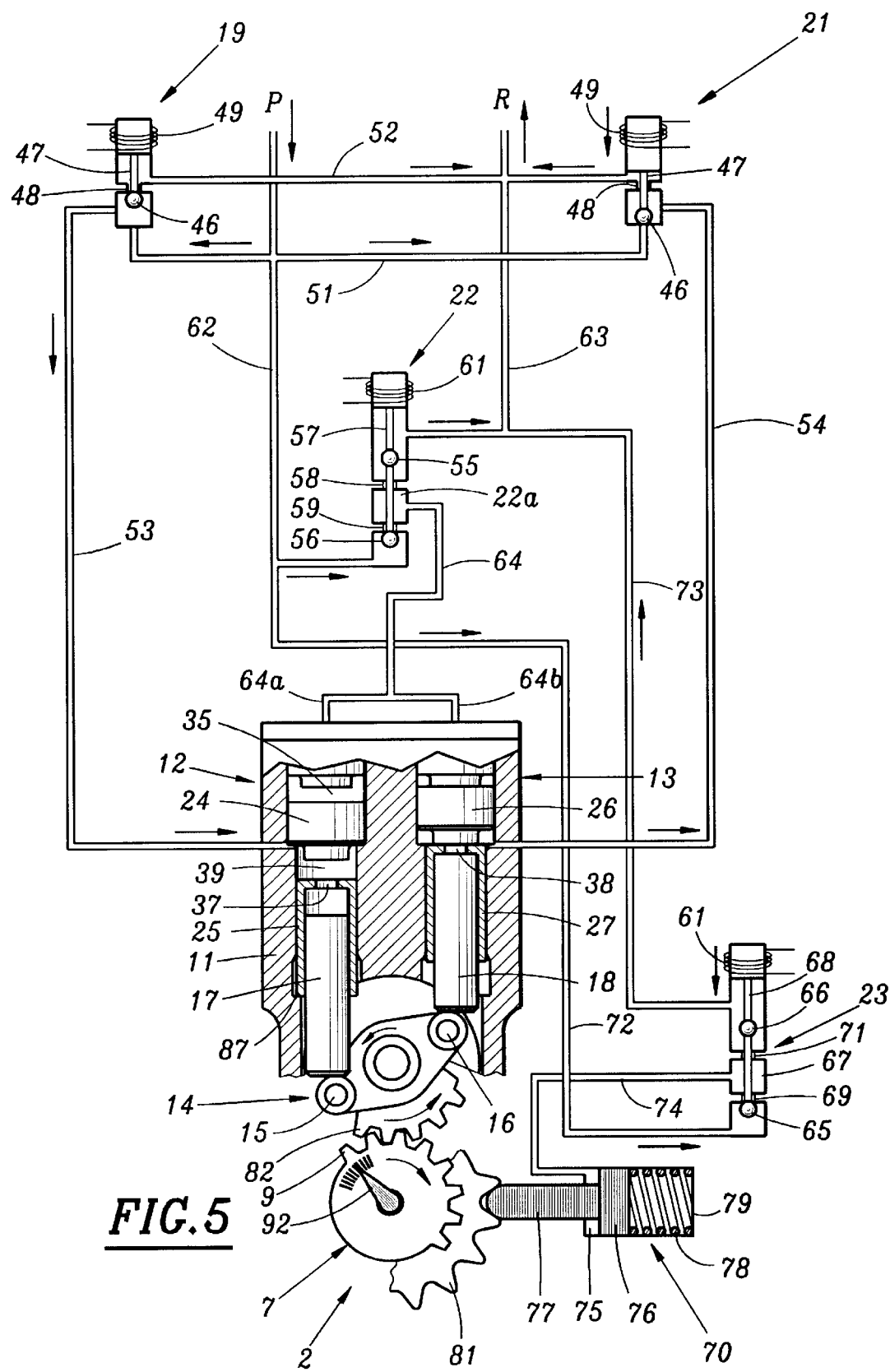
FIG. 5 is a view of one embodiment of the hydraulic circuit for controlling the two rams and the rocker of the actuator of FIGS. 1 to 4.

Each ram 12, 13 comprises three coaxial pistons, namely respectively for the ram 12: the pistons 24, 25 and 17 which interact with the stud 15 and, for the ram 13, the pistons 26, 27 and 18, it being possible for the last one to interact with the stud 16 of the rocker 14. The pistons 24, 25, 17 and 26, 27, 18 have cross sections which decrease from the first piston 24, 26 to the third piston 17, 18. Provided in each ram 12, 13 is a chamber 28, 29 which is subdivided into two respective compartments 28a, 28b and 29a, 29b the cross sections of which correspond to the respective pistons 24, 25 and 26, 27. These compartments are separated by annular shoulders 31, 32 and the first compartments 28a, 29a are made on the furthest side of the ram from the rocker 14. The first pistons 24 and 26 can travel with a stroke which is delimited by stop pieces 50, 60 fixed to the closed end 33, 34 of the respective compartments 28a, 29a and the shoulders 31, 32 forming limit stops for the pistons. Corresponding chambers 35, 36 are therefore made between the components 50, 60. In FIGS. 3 and 5, the piston 24 is resting against the shoulder 31 and the piston 26 is resting against the component 60, in a raised position.

The second compartment 28b, 29b contains the second piston 25, 27 and the third respective piston 17, 18 which is mounted so that it can slide inside the associated second piston 25, 27. The second piston 25, 27 is tubular, open in the direction of the rocker 14 in order to allow the respective interior piston 17, 18 to slide, and on the opposite side includes a closed end pierced with a central opening 37, 38 placing the inside of the said piston 25, 27 in communication with an intermediate chamber: in FIG. 3 only the intermediate chamber 39 of the piston 25 is visible because the pistons 25 and 24 are apart, whereas the pistons 26 and 27 are in contact with each other, the piston 27 being at the end of its travel against the piston 26.

These intermediate chambers such as 39 are therefore delimited by the respective pistons 24, 26 and the associated tubular pistons 25, 27.

Facing the rocker 14, the body 11 is equipped with two stops 42, 43 for limiting the rotation of the rocker 14, these stops being arranged to be able to interact respectively with the studs 15 and 16. When the piston 17 has covered its maximum stroke and brought the stud 15 to rest against the limit stop 42, the rocker 14 together with the shaft 7 and the barrel 2 has turned through an angle such that the stud 16 is in a raised position, the corresponding piston 18 and the tubular piston 27 being in their extreme raised position (FIG. 5).

The stops 42, 43 may consist, for example, of adjustable threaded shanks associated with nuts 44, 45 as illustrated in FIG. 3.

The hydraulic circuit associated with the rams 12 and 13 and illustrated in FIG. 5 will now be described.

The two solenoid valves 19 and 21 are of the type having a single shut-off ball 46 fixed to the end of a core plunger 47 and able to move longitudinally on each side of a seat 48, depending on whether or not the solenoid valve winding 49 is energized. In the position represented in FIG. 5, the solenoid valve 19 is in its unenergized state which means that its ball 46 is pressed against the seat 48 which it closes, whereas the solenoid valve 21 is in its energized state, current flowing through the winding 49, and the ball 46 together with the core plunger 47 being pushed back away from the seat 48 which means that the solenoid valve is open.

The solenoid valves 19, 21 are joined together by two pipes 51 and 52 of which one 51 is supplied with pressurized hydraulic fluid P and the other 52 communicates with the return R to tank. Furthermore, each solenoid valve 19, 21 is connected by a corresponding line 53, 54 to the intermediate chamber 39 of the associated ram 12, 13.

The hydraulic circuit comprises a third solenoid valve 22 of the type having two shut-off balls 55, 56 integral with a core plunger 57 and able to move therewith on each side of two respective seats 58, 59 depending on whether or not the winding 61 is energized, the two seats 58, 59 being separated by an intermediate chamber 22a. In the position represented in FIG. 5, the solenoid valve 22 is not energized and the ball 56 furthest away from the winding 61 is pressed onto its seat 59 whereas the ball 55 is off its seat 58.

The solenoid valve 22 is connected on the one hand via its compartment containing the ball 56 to a pipe 62 for supplying pressurized hydraulic fluid P and via its compartment containing the ball 55 to a pipe 63 for return to tank R. Furthermore, the solenoid valve 22 is connected by its intermediate chamber 22a to a user line 64 leading into the chambers 35, 36 via the inside of the stop pieces 50, 60. For this purpose the line 64 splits into two branches 64a, 64b which lead into the associated chambers 35, 36.

Energizing the third solenoid valve 22 moves the ball 56 off its seat and by contrast presses the ball 55 onto its seat 58, which places the pipe 62 for pressurized fluid P and the user pipe 64 in communication via the intermediate compartment 22a. By contrast, when not energized, the ball 56 is pressed onto its seat 59 and the ball 55 is moved off its seat 58 which means that the solenoid valve 22 then places the user pipe 64 and the pipe 63 for return to tank R in communication (FIG. 5).

The hydraulic circuit is supplemented by the fourth solenoid valve 23 which is of the same type as the solenoid valve 22 and therefore has two balls 65, 66 which are fixed to a core plunger 68 which can be moved by energizing the winding 61. The core plunger 68 passes through an intermediate compartment 67 interposed between the two respective compartments containing the balls 65, 66 and at the ends of which the seats 69, 71 for the balls 65, 66 are formed.

The solenoid valve 23 is connected by a line 72 to the pipe 62 for supplying pressurized fluid P and by a line 73 to the pipe 63 for return to tank R; the lines 72, 73 lead into the respective compartments for the balls 65, 66. Furthermore, the intermediate compartment 67 of the solenoid valve 23 is connected by a user line 74 to the chamber 75 of an "anti-flutter" ram 70 of which the piston 76, extended by a rod 77, is constantly urged by an elastic member 78 inside the cylinder 79 of the ram 76. This member 78 may consist, as represented, of a helical spring resting against the closed end of the cylinder 79 and which pushes the piston 76 as well as the rod 77 in such a way that this rod tends to remain constantly in mesh in toothing 81 of the barrel 2 and integral in terms of rotation therewith. The user line 74 of the solenoid valve 23 leads into the chamber 75 formed in the closest end of the cylinder to the toothing 81, which means that when pressurized fluid is dispatched to this chamber 75, the pressure is exerted on the piston 76 against the antagonistic return force of the spring 78 until this pressure exceeds this return force, which then moves the end of the rod 77 away from the toothing 81.

When the solenoid valve 23 is not energized, as represented in FIG. 5, the ball 65 is pressed against its seat 69 and the ball 66 is moved off its seat 71 which means that the user line 74 communicates, via the intermediate compartment 67, with the line 73 for return to tank R and that the chamber 75 is therefore no longer pressurized. In this case the spring 68 keeps the end of the rod 77 in mesh with the toothing 81. Conversely, when the solenoid valve 23 is in its energized state, the ball 66 is pressed against its seat 71, the ball 65 is moved off its seat 69, which means that the line 74 communicates with the pipes 72, 62 for pressurized fluid P and that the chamber 75 is pressurized, which moves the rod 77 away from the toothing 81 as soon as the pressure is sufficient.

The rocker 14 is integral with a toothed sector 82 (FIG. 5) kept constantly in mesh with the toothing 9 integral with the shaft 7 of the barrel 2.

The angular position of the barrel 2 may be monitored by a rotary potentiometer 92 (FIG. 5) associated in a way known per se with the shaft 7.

This potentiometer 92 constitutes a detector for reporting on the angular position of the barrel 2.

Figure 4:
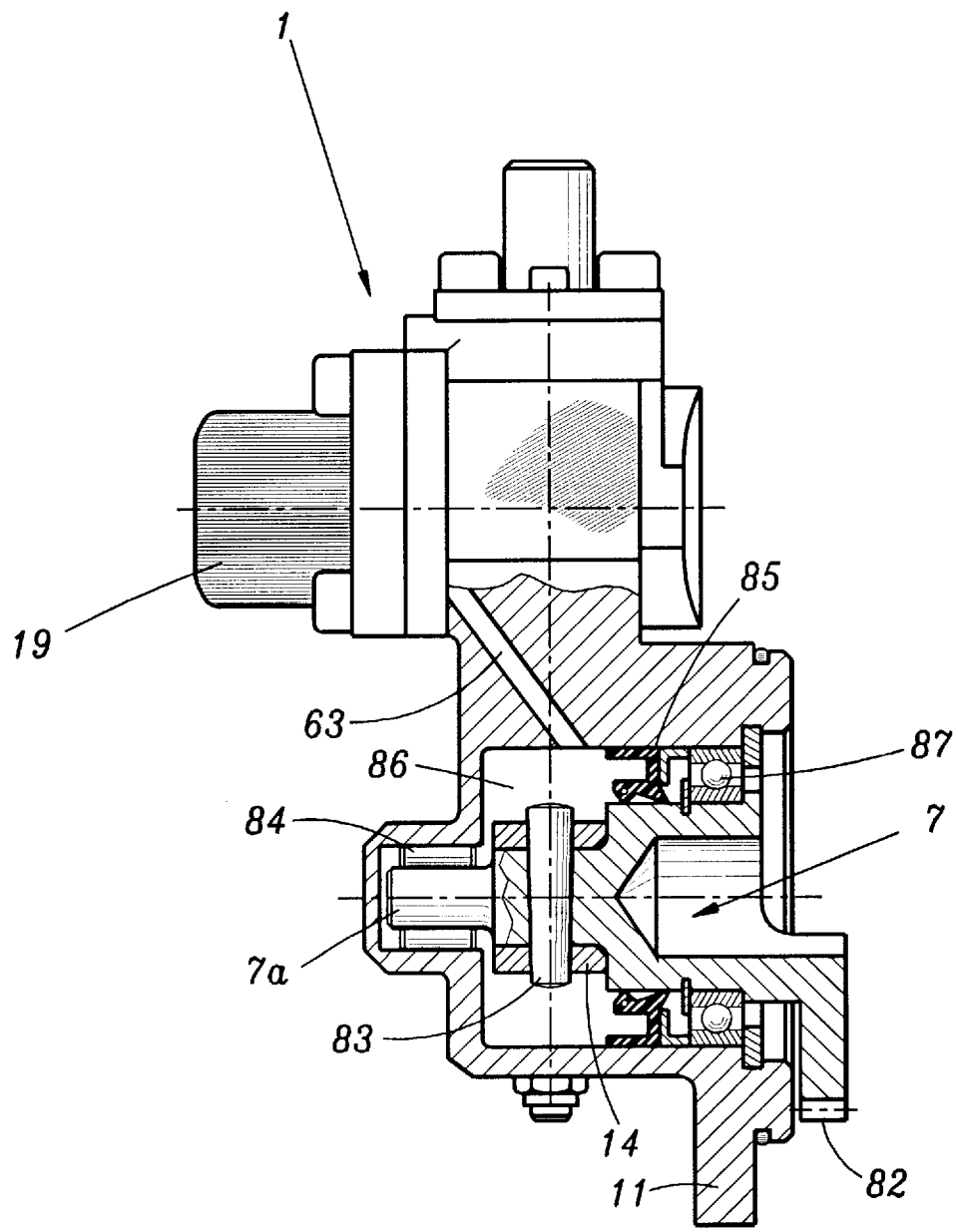
FIG. 4 is a view in part section on the plane 4 of FIG. 3.

The rocker 14 is secured to the end of the shaft 7 (FIG. 4) by a transverse pin 83, the shaft end 7a resting in the body 11 via needle bearings 84. A seal 85 is interposed between the shaft 7 and the wall of the chamber 86 inside the body 11 in which chamber the end of the shaft 7 is engaged, resting on ball bearings 87.

The electrohydraulic actuator which has just been described works as follows.

The angular positions of the rocker 14 and therefore of the shaft 7 as well as the barrel 2, and consequently corresponding gear changes of the box by the forks associated with the barrel 2 in a way known per se, are determined solely by the pistons 17, 18 coming to rest against the respective studs 15, 16 of the rocker 14.

If, for example, as illustrated in FIG. 5, the solenoid valves 19 and 22 are in the non-energized state and the solenoid valve 21 is energized, then pressurized fluid P passes through the solenoid valve 19 and the associated user line 53 into the intermediate chamber 39 which is thus pressurized. At the same time, the chambers 35, 36 are placed in communication with the line 63 for return to tank via the line 64 and the solenoid valve 22, the ball 55 of which is moved off its seat 58. Thus the pistons 24, 26 are pushed to rest against the stop pieces 50, 60 of their chambers, while the piston 25 slides until it comes to rest against a shoulder 87 of the body 11, and until pressurized fluid flowing through the passage 37 fills the chamber inside the piston 25.

The piston 17 inside this last piston is therefore pushed back against the stud 15 until the latter is stopped by the stop 42, the rocker 14 having turned as far as its position represented in FIG. 5, driving the shaft 7 with it. In the same movement the piston 18 is pushed back into the piston 27 by the stud 16, comes at the end of its stroke to rest against the piston 26 which is itself resting at the end of its travel against the component 60.

The rotation of the rocker 14 drives that of the shaft 7 and of the barrel 2, via the toothings 82 and 9.

Each time the rams 12, 13 are actuated to control a gear change, the solenoid valve 23 is energized to place the user line 74 in communication with the pipes 72, 62 for pressurized fluid P. This allows the rod 77 to be withdrawn from the toothing 81 during the corresponding gear change. The anti-flutter ram 78 is thus actuated upon each gear change, and this has a two-fold advantage: in this way premature wearing of the toothing 81 of the barrel 2 is avoided, and, on the other hand, gear change is made still swifter or, alternatively, the cross section of the rams 12, 13 may be reduced.

These rams may be controlled in such a way that the corresponding pistons travel just half of their stroke, in which position the forks are also at half their stroke.

The various states which can be adopted by the four solenoid valves 19, 21, 22, 23 in changing up through the gears and in changing down through the gears are represented in the following truth table.

The gear sequence in this truth table is from a positional report using the rotary potentiometer 92. By contrast, a break in this report does not cause inadvertent change to other gears. The position detector formed by the potentiometer 92 has been represented mounted coaxial with the axis of the barrel 2.

Thanks to this actuator it is possible to control the gear changes extremely swiftly with a structure which is simpler than, and therefore at a cost of manufacture which is lower than, the actuator of the aforementioned prior patent.

What is claimed is:

1. Electrohydraulic actuator for controlling the rotation of a vehicle gearbox input barrel (2), comprising a body (11) containing a rocker (14) which is integral in terms of rotation with an input shaft (7) of the barrel, and means for controlling the rotation of the rocker, characterized in that the said control means comprise a pair of hydraulic rams (12, 13) arranged parallel to one another so as to be able to control the rotation of the rocker in order to make it adopt predetermined angular positions corresponding to the gears (R, N, 1, 2, . . . ) selected, this actuator also comprising solenoid valves (19, 21, 22, 23) for controlling the rams, and in that each ram comprises three pistons (24, 25, 17; 26, 27, 18) which are coaxial and of different cross sections, arranged in chambers (28, 29) of corresponding cross sections formed in the body (11), the rocker (14) extending transversely to the shaft (7) and its ends being designed to be able to interact with respective pistons (17, 18) of the rams (12, 13).

2. Actuator according to claim 1, characterized in that each ram (12, 13) comprises a hydraulic chamber (28, 29) subdivided into two coaxial compartments (28a, 28b; 29a, 29b) of different cross sections, in that the first compartment (28a, 29a) which has a greater cross section than the second compartment (28b, 29b) is made on the side furthest from the rocker (14), contains a first piston (24, 26) which can travel as far as a limit stop (31, 32) delimiting the two compartments, and in that the second compartment (28b, 29b) contains a second piston (25, 27) and a third piston (17, 18), where the third piston is mounted so that it can slide inside the second and interacts with a corresponding end (15, 16) of the rocker (14).

3. Actuator according to claim 2, characterized in that the said second piston (25, 27) of the second compartment (28b, 29b) is tubular and has a closed end pierced with an opening (37, 38) placing the inside of the said piston in communication with an intermediate chamber (39) delimited by the said first piston (24, 26) and the said tubular second piston (25, 27), and in that the opposite end of the latter to its closed end is open to allow the third piston (17, 18) to slide in the second piston (25, 27).

|  | Configuration of the solenoid valves (0 = not engerigized) (1 = energized) | | | | | | | | | | | | | | | |
| --- | --- | --- | --- | --- | --- | --- | --- | --- | --- | --- | --- | --- | --- | --- | --- | --- |
|  | R | N | 1 | 2 | 3 | 4 | 5 | 6 | 7 | | | | | | | |
|  | Changing up through the gears | | | | | | | | | | | | | | | |
| SV19 | 0 | 0 | 0 | 0 | 0 | 0 | 0 | 0 | 0 | 0 | 0 | 0 | 0 | 0 | 0 | 0 |
| SV21 | 0 | 1 | 0 | 1 | 0 | 1 | 0 | 1 | 0 | 1 | 0 | 1 | 0 | 1 | 0 | 1 | 0 |
| 5V22 1/2 stroke | 1 | 1 | 1 | 1 | 0 | 0 | 0 | 0 | 0 | 0 | 0 | 0 | 0 | 0 | 0 | 0 |
| 5V23 anti-flutter | 0 | 1 | 0 | 1 | 0 | 1 | 0 | 1 | 0 | 1 | 0 | 1 | 0 | 1 | 0 | 1 | 0 |
|  | Changing down through the gears | | | | | | | | | | | | | | | |
| SV19 | 0 | 1 | 0 | 1 | 0 | 1 | 0 | 1 | 0 | 1 | 0 | 1 | 0 | 1 | 0 | 1 | 0 |
| SV21 | 0 | 0 | 0 | 0 | 0 | 0 | 0 | 0 | 0 | 0 | 0 | 0 | 0 | 0 | 0 | 0 |
| SV22 1/2 stroke | 1 | 1 | 1 | 1 | 0 | 0 | 0 | 0 | 0 | 0 | 0 | 0 | 0 | 0 | 0 | 0 |
| SV23 anti-flutter | 0 | 1 | 0 | 1 | 0 | 1 | 0 | 1 | 0 | 1 | 0 | 1 | 0 | 1 | 0 | 1 | 0 |

In this truth table, opposite each solenoid valve referenced "SV19", "SV21", "SV22", "SV23" and for changing up as well as changing down through the gears, for reverse R, neutral N, and the gears 1, 2, 3, 4, 5, 6, 7, the various states of the solenoid valves are requested: 0 is the non-energized state and 1 is the energized state. It will be observed that upon each gear change the anti-flutter solenoid valve 23 is energized (state 1) in order to withdraw the rod 77 from the toothing 81, which facilitates and speeds up the change from one gear to another; before and after each change it is therefore in the non-energized state (0) which means that the rod 77 returns into mesh with the toothing 81 and holds the angular position of the barrel 2 for the gear chosen.

4. Actuator according to claim 3, characterized in that it comprises a first and a second solenoid valve (19, 21) each having just one shut-off ball (46), these solenoid valves being connected together by two pipes of which one (51) is supplied with pressurized hydraulic fluid and the other (52) communicates with the return to tank (R), and in that each of these solenoid valves is furthermore connected by user pipes (53, 54) to the said intermediate chamber (39) of the associated ram (12, 13).

5. Actuator according to claim 4, characterized in that it is provided with a third solenoid valve (22) connected to a pipe (62) for supplying pressurized hydraulic fluid (P) and to a pipe (63) for return to tank (R), and also to a user line (64) leading into the chambers (35, 36) made between the closed ends (33, 34) and the first pistons (24, 26) of each ram (12, 13), this third solenoid valve being provided with a pair of balls (55, 56) fixed to a mobile core plunger (57) and associated with two corresponding seats (58, 59) so that energizing this third solenoid valve places the pressurized pipe (62) and the user pipe (64) in communication, whereas when the solenoid valve is not energized the user pipe (64) and return to tank pipe (63) are placed in communication.

6. Actuator according to claim 5, characterized in that it includes a fourth solenoid valve (23) connected to the pipe (62) for supplying pressurized fluid (P) and to the pipe (73, 63) for return to tank, and also to an anti-flutter ram (70) the piston (76) of which is constantly urged by an elastic member (78) against toothing (81) integral in terms of rotation with the barrel (2), in that the said fourth solenoid valve is provided with a pair of balls (65, 66) integral with a moving core plunger (68) and associated with two corresponding seats (69, 71) of a compartment (67) through which the moving core plunger passes, this compartment communicating with a user line (74) which leads into a chamber (75) of the anti-flutter ram which is formed on the opposite side of the piston to the elastic return member, and in that the said user line (74) and the compartment (67) communicate with the pressurized-fluid supply (72, 62) when the solenoid valve is energized, and with the return to tank (R) when the solenoid valve is not energized.

7. Actuator according to claim 1, characterized in that the body (11) is equipped with limit stops (42, 43) for limiting the rotation of the rocker (14), the stops being associated respectively with each end (15, 16) of the said rocker and determining the limits of travel of the pistons (17, 18) of the rams (12, 13).

8. Actuator according to claim 7, characterized in that the rocker (14) is integral with a toothed sector (82) in mesh with a gearwheel (9) itself integral in terms of rotation with the barrel (2).

* * * * *